(12) United States Patent
Herrera et al.

(10) Patent No.: US 10,821,695 B2
(45) Date of Patent: Nov. 3, 2020

(54) ACOUSTIC DEVICE MANUFACTURING SYSTEM

(71) Applicant: The Boeing Company, Chicago, IL (US)

(72) Inventors: Eric Herrera, Mukilteo, WA (US); John Scott Bauman, Federal Way, WA (US); Peter James Oberst, Mendota Heights, MN (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 15/708,573

(22) Filed: Sep. 19, 2017

(65) Prior Publication Data

US 2019/0084261 A1   Mar. 21, 2019

(51) Int. Cl.
| | | |
|---|---|---|
| *B64D 33/02* | (2006.01) | |
| *B64D 29/00* | (2006.01) | |
| *B29D 99/00* | (2010.01) | |
| *B29D 24/00* | (2006.01) | |
| *B29C 65/04* | (2006.01) | |
| *B29C 65/08* | (2006.01) | |

(Continued)

(52) U.S. Cl.
CPC ............ *B29D 99/001* (2013.01); *B29C 65/04* (2013.01); *B29C 65/08* (2013.01); *B29C 65/10* (2013.01); *B29C 66/431* (2013.01); *B29C 66/4326* (2013.01); *B29C 66/49* (2013.01); *B29C 66/729* (2013.01); *B29C 66/8322* (2013.01); *B29D 24/005* (2013.01); *B29D 99/0089* (2013.01); *B32B 3/12* (2013.01); *B64F 5/10* (2017.01); *E04B 1/82* (2013.01); *F02C 7/045* (2013.01); *F02K 1/827* (2013.01); *G10K 11/16* (2013.01); *G10K 11/172* (2013.01); *B29L 2031/38* (2013.01); *B29L 2031/608* (2013.01); *B29L 2031/7724* (2013.01); *B32B 2307/10* (2013.01); *B64D 29/00* (2013.01); *B64D 33/02* (2013.01); *B64D 2033/0206* (2013.01); *E04B 2001/748* (2013.01); *E04B 2001/8245* (2013.01); *F05D 2230/23* (2013.01); *F05D 2250/283* (2013.01); *F05D 2260/96* (2013.01); *G10K 2210/1281* (2013.01)

(58) Field of Classification Search
CPC .. B29L 2031/38; B29C 65/04; B25J 15/0052; B29D 24/005; B64D 2033/0206; B64D 29/00; F02K 1/827; B32B 37/142; B32B 3/12
See application file for complete search history.

(56) References Cited

U.S. PATENT DOCUMENTS

| | | |
|---|---|---|
| 820,477 A | 5/1906 | Croskey |
| 9,334,059 B1 | 5/2016 | Jones et al. |

(Continued)

*Primary Examiner* — Alison L Hindenlang
*Assistant Examiner* — Debjani Roy
(74) *Attorney, Agent, or Firm* — Yee & Associates, P.C.

(57) ABSTRACT

A method and system for manufacturing a conical shaped acoustic structure. A sheet of acoustical material is cut to form individual pieces using a cutter system. Each individual piece in the individual pieces has a flat pattern for the conical shaped acoustic structure. An individual piece is positioned around a mandrel with a conical shape using an actuator system. Two edges of the individual piece are positioned for joining. The two edges of the individual piece positioned around the mandrel are joined to form the conical shaped acoustic structure.

21 Claims, 14 Drawing Sheets

(51) Int. Cl.
    *B29C 65/10*     (2006.01)
    *B32B 3/12*     (2006.01)
    *G10K 11/16*     (2006.01)
    *F02C 7/045*     (2006.01)
    *F02K 1/82*     (2006.01)
    *E04B 1/82*     (2006.01)
    *B29C 65/00*     (2006.01)
    *G10K 11/172*     (2006.01)
    *B64F 5/10*     (2017.01)
    *B29L 31/60*     (2006.01)
    *E04B 1/74*     (2006.01)
    *B29L 31/00*     (2006.01)
    *B29L 31/38*     (2006.01)

(56) References Cited

U.S. PATENT DOCUMENTS

| | | | |
|---|---|---|---|
| 9,693,166 B2 | 6/2017 | Herrera et al. | |
| 2015/0373470 A1* | 12/2015 | Herrera | H04R 31/00 |
| | | | 156/196 |
| 2016/0009067 A1 | 1/2016 | Gerken et al. | |
| 2017/0191414 A1* | 7/2017 | Martinez | F04D 29/664 |
| 2017/0303059 A1* | 10/2017 | Herrera | B25J 15/0052 |

* cited by examiner

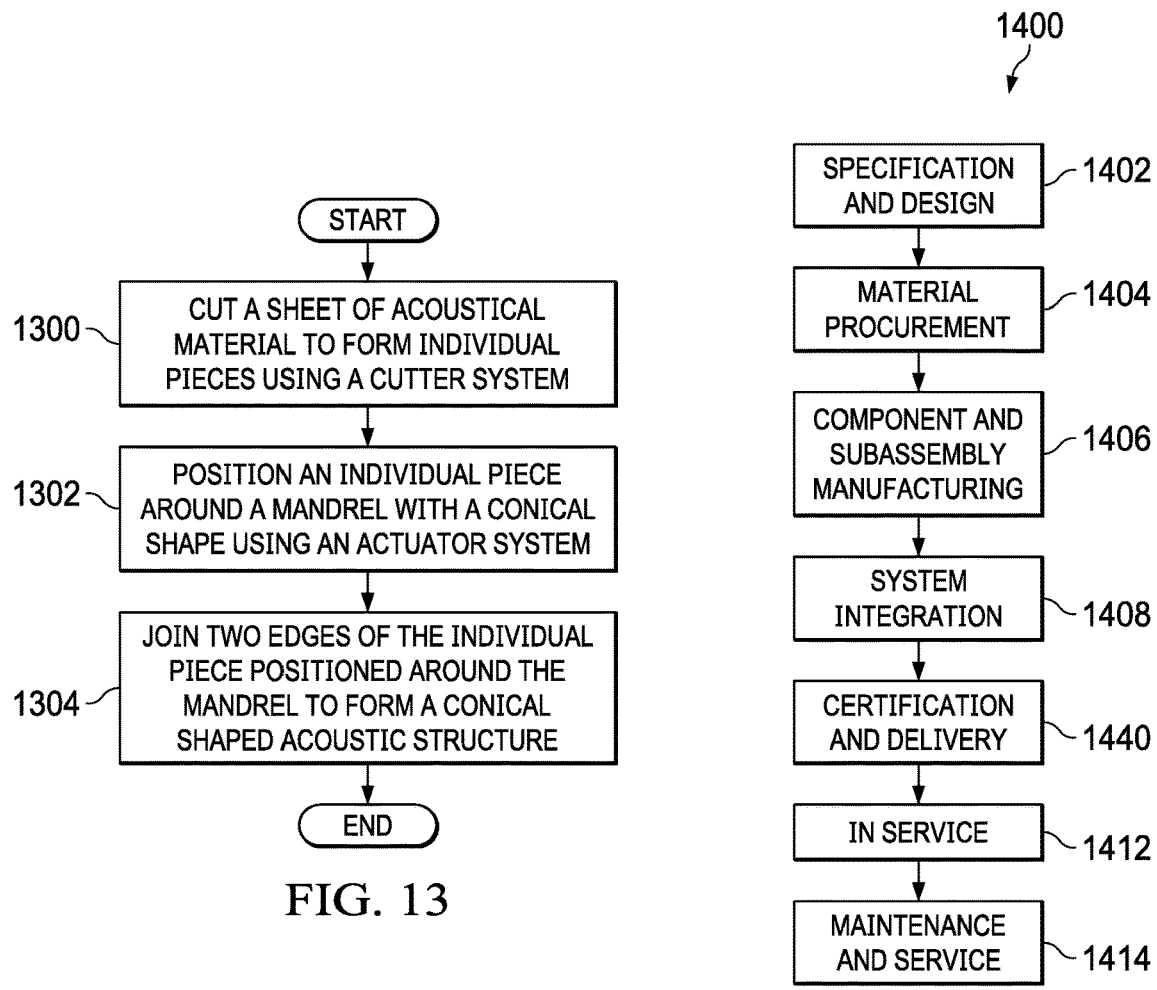
FIG. 13
FIG. 14
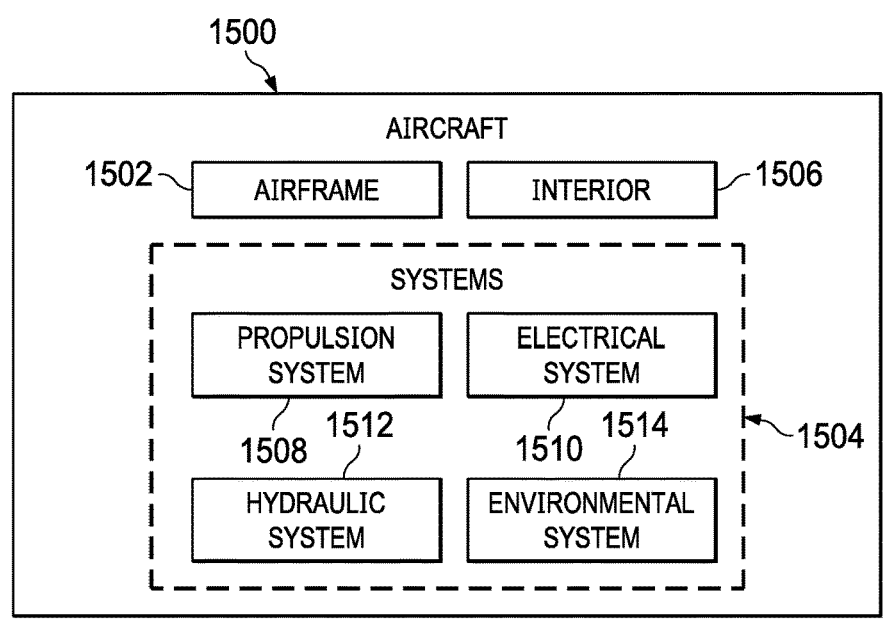
FIG. 15

ACOUSTIC DEVICE MANUFACTURING SYSTEM

BACKGROUND INFORMATION

1. Field

The present disclosure relates generally to acoustic devices and, in particular, to a method and apparatus for manufacturing conical shaped acoustic devices.

2. Background

Noise reduction is desired in many environments, especially with aircraft. Aircraft noise is a concern with respect to operation near cities and other population centers.

One place where sound reduction mechanisms are used in an aircraft is in aircraft engines. For example, panels have been used in aircraft engines to reduce the sound generated by engines. For example, soundproof panels may be used to suppress engine noise caused by fan noise originating from intake fans and the interaction of airflow with stators in the engine nacelle. Acoustic panels may be used in the nacelle of an aircraft or other portions of the engine housing to reduce specific frequencies generated by a turbine, a compressor, or general broadband noise from the aircraft engine.

A sandwich panel is an example of one form for an acoustic panel and may have a honeycomb core between two skin panels. Septa can be placed in the cells of the honeycomb core to reduce sound generated by the aircraft engine. Currently, septa are planar structures having a hexagonal shape that are inserted into the cells of the honeycomb core to define acoustic chambers.

The inserting and attaching of these structures to the cells in the honeycomb core, however, is a time consuming and complex process. A single panel can have thousands of cells. Given the number of cells, these structures take longer than desired to install and increase the cost of producing sandwich panels for soundproofing engines.

Therefore, it would be desirable to have a method and apparatus that take into account at least some of the issues discussed above, as well as other possible issues. For example, it would be desirable to have a method and apparatus that overcome technical problems with current designs for acoustic panels that reduce sound.

SUMMARY

An embodiment of the present disclosure provides an acoustic device manufacturing system. The acoustic manufacturing device system is comprised of a cutter system, a mandrel, an actuator system, and a joiner. The cutter system is configured to receive a sheet of acoustical material and cut individual pieces from the sheet of acoustical material. Each individual piece in the individual pieces has a flat pattern for a conical shaped acoustic structure. The mandrel has a conical shape. The actuator system is configured to position an individual piece in the individual pieces around the mandrel such that two edges of the individual piece are positioned for joining. The joiner is configured to join the two edges of the individual piece to form the conical shaped acoustic structure.

Another embodiment of the present disclosure provides a method for manufacturing a conical shaped acoustic structure. A sheet of acoustical material is cut to form individual pieces using a cutter system. Each individual piece in the individual pieces has a flat pattern for the conical shaped acoustic structure. An individual piece is positioned around a mandrel with a conical shape using an actuator system. Two edges of the individual piece are positioned for joining. The two edges of the individual piece positioned around the mandrel are joined to form the conical shaped acoustic structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of a flowchart of a process for manufacturing a conical shaped acoustic structure in accordance with an illustrative embodiment;

FIG. 14 is an illustration of a block diagram of an aircraft manufacturing and service method in accordance with an illustrative embodiment;

FIG. 15 is an illustration of a block diagram of an aircraft in accordance with an illustrative embodiment.

DETAILED DESCRIPTION

The illustrative embodiments recognize and take into account one or more different considerations. For example, the illustrative embodiments recognize and take into account that inserting planar structures into cells of a honeycomb structure is not as efficient as desired with the number of cells that may be present in a soundproof panel. The illustrative embodiments recognize and take into account that using a different shape of an acoustic device is desirable. For example, the illustrative embodiments recognize and take into account that conical shaped acoustic devices, i.e. out of plane, may provide a desired effect of reducing sound used in the cells of the honeycomb structure.

The illustrative embodiments recognize and take into account that it is desirable to efficiently fabricate conical shaped acoustic devices for use in sandwich panels to form soundproof panels. Thus, the illustrative embodiments provide a method, apparatus, and system for manufacturing conical shaped, out of plane, acoustic structures that can be inserted into cells of a honeycomb panel.

In one illustrative example, a manufacturing system comprises a cutter system, a mandrel, an actuator system, and a joiner. The cutter system is configured to receive a sheet of acoustical material and cut individual pieces from the sheet of acoustical material in which each individual piece has a flat pattern for a conical shaped acoustic structure. The mandrel has a conical shape. The actuator system is configured to position an individual piece in the individual pieces around the mandrel such that two edges of the individual piece are positioned for joining in a manner that forms the conical shaped acoustic structure. The joiner is configured to join the two edges of the individual piece to form the conical shaped acoustic structure.

Figure 1:
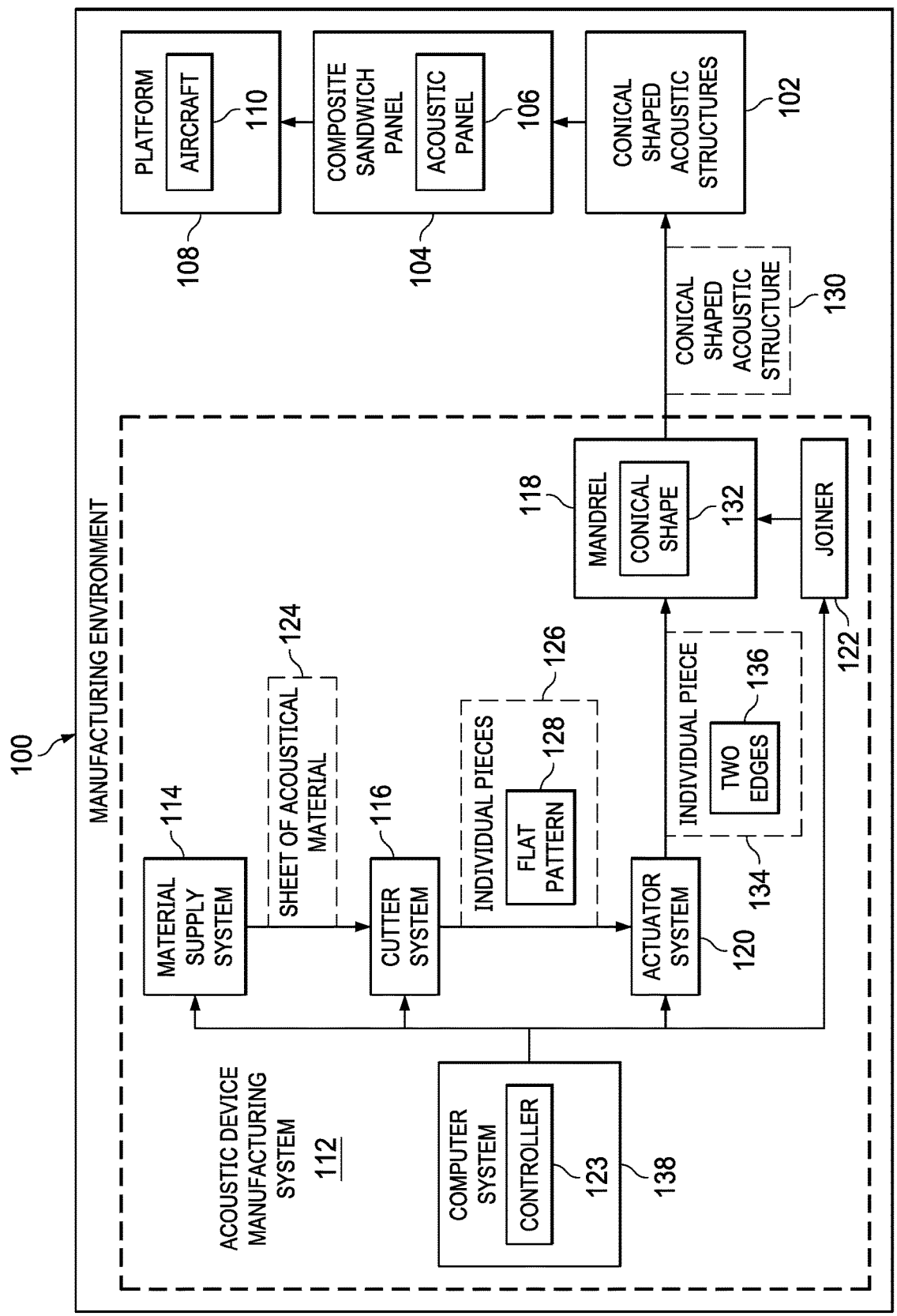
FIG. 1 is an illustration of a block diagram of a manufacturing environment in accordance with an illustrative embodiment.

With reference now to the figures and, in particular, with reference to FIG. 1, an illustration of a block diagram of a manufacturing environment is depicted in accordance with an illustrative embodiment. Manufacturing environment 100 is an environment in which conical shaped acoustic structures 102 can be manufactured. Conical shaped acoustic structures 102 can be utilized in composite sandwich panel 104 as acoustic panel 106. As depicted, acoustic panel 106 can be installed in platform 108 to reduce the effects of sound in platform 108. In the illustrative example, platform 108 takes the form of aircraft 110.

As depicted, conical shaped acoustic structures 102 can be manufactured using acoustic device manufacturing system 112. As depicted, acoustic device manufacturing system 112 includes material supply system 114, cutter system 116, mandrel 118, actuator system 120, joiner 122, and controller 123.

Material supply system 114 is configured to supply sheet of acoustical material 124 to cutter system 116. The acoustical material is a material having acoustic properties useable in acoustic structures. The acoustical material is selected as a material that performs at least one of absorbing or controlling sound waves. The acoustical material is a material that can reduce reverberation of sound waves.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C, or item B and item C. Of course, any combinations of these items may be present. In some illustrative examples, "at least one of" may be, for example, without limitation, two of item A, one of item B, and ten of item C; four of item B and seven of item C; or other suitable combinations.

In the illustrative example, the acoustical material is an acoustic fabric. The acoustic fabric is designed and tuned for acoustic performance and the manufacturing of the acoustic fabric is not limited to weaving.

As depicted, cutter system 116 is configured to receive sheet of acoustical material 124 and cut individual pieces 126 from sheet of acoustical material 124. Cutter system 116 is selected from at least one of a laser cutting machine, a material die cutting machine, or some other suitable device for cutting sheet of acoustical material 124. Each individual piece in individual pieces 126 has flat pattern 128 for conical shaped acoustic structure 130 in conical shaped acoustic structures 102. Flat pattern 128 has dimensions that are designed to form a three-dimensional structure in the form of conical shaped acoustic structure 130.

Mandrel 118 has conical shape 132. In this example, conical shape 132 is selected such that individual piece 134 in individual pieces 126 can be processed to form conical shaped acoustic structure 130. Conical shape 132 can be a flat conical shape. In other words, conical shape 132 may have dimensions that allow for two edges 136 of individual piece 134 to be folded over onto mandrel 118 for joining. When conical shape 132 is a flat conical shape, conical shaped acoustic structure 130 opens up into the full conical shaped acoustic structure 130 for use in conical shaped acoustic structures 102. In another illustrative example, conical shape 132 may be a full conical shape that has the final shape for conical shaped acoustic structure 130.

Mandrel 118 can utilize any material that can be manipulated from a planar, flat, dimension into out of plane. The materials may be, without limitation, woven, non-woven, knitted, or other suitable materials.

In this illustrative example, actuator system 120 is configured to position individual piece 134 in individual pieces 126 around mandrel 118 such that two edges 136 of individual piece 134 are positioned for joining. An actuator in actuator system 120 is a component of a machine that moves, such as moving individual piece 134 around mandrel 118.

As depicted, joiner 122 is configured to join two edges 136 of individual piece 134 to form conical shaped acoustic structure 130. In the illustrative example, joiner 122 is selected from at least one of an ultrasonic welder, a hot air welder, a dielectric welder, or some other suitable device or system that can join two edges 136 to each other.

Controller 123 is configured to control the operation of other components in acoustic device manufacturing system 112. In this illustrative example, controller 123 is in communication with cutter system 116, actuator system 120, and joiner 122. Depending on the complexity of material supply system 114, controller 123 also may be in communication with and control the operation of material supply system 114.

Controller 123 may be implemented in software, hardware, firmware, or a combination thereof. When software is used, the operations performed by controller 123 may be implemented in program code configured to run on hardware, such as a processor unit. When firmware is used, the operations performed by controller 123 may be implemented in program code and data and stored in persistent memory to run on a processor unit. When hardware is employed, the hardware may include circuits that operate to perform the operations in controller 123.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components. For example, the processes may be implemented as circuits in organic semiconductors.

In the illustrative example, controller 123 may be located within computer system 138. Computer system 138 is a physical hardware system and includes one or more data processing systems. When more than one data processing system is present, the data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with efficiently manufacturing acoustic panels that reduce sound. As a result, one or more technical solutions may provide a technical effect of manufacturing conical shaped acoustic structures in a manner that increases the efficiency of fabricating the acoustic panels that incorporate conical shaped acoustic structures 102. For example, one or more technical solutions may provide a technical effect of reducing at least one of the complexity, labor, or cost. Another technical effect may be present in which the production of conical shaped acoustic structures 102 can be fabricated at a rate that results in more efficient manufacturing of acoustic panels for sound reduction in platforms, such as aircraft 110.

As a result, computer system 138 operates as a special purpose computer system in which controller 123 in computer system 138 enables manufacturing of conical shaped acoustic structures 102 with a desired level of efficiency. In particular, controller 123 transforms computer system 138 into a special purpose computer system as compared to currently available general computer systems that do not have controller 123.

Figure 2:
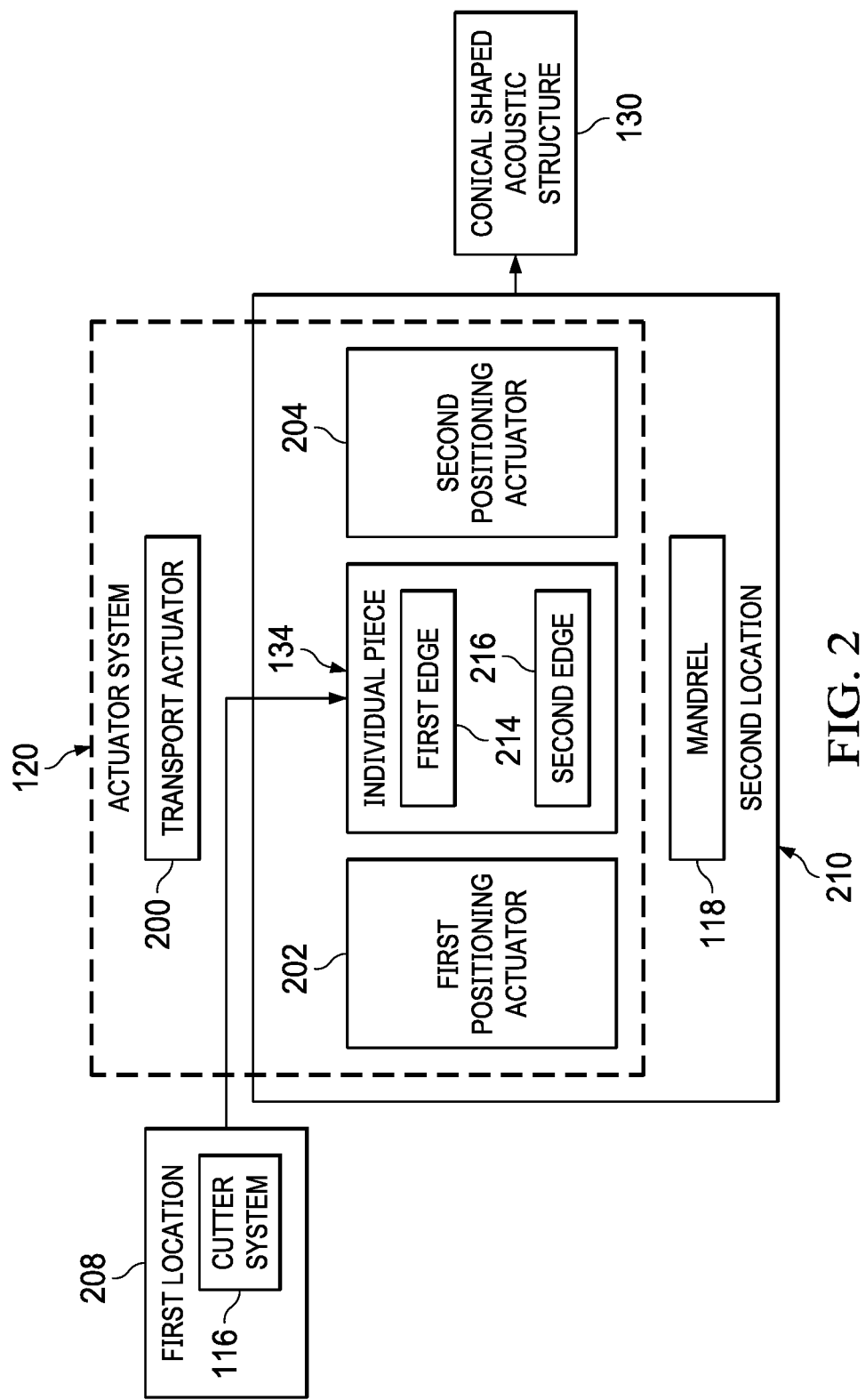
FIG. 2 is an illustration of a block diagram of an actuator system in accordance with an illustrative embodiment.

Turning next to FIG. 2, an illustration of a block diagram of an actuator system is depicted in accordance with an illustrative embodiment. In the illustrative examples, the same reference numeral may be used in more than one figure. This reuse of a reference numeral in different figures represents the same element in the different figures.

In this illustrative example, actuator system 120 is comprised of a number of different actuators. As depicted, actuator system 120 includes transport actuator 200, first positioning actuator 202, and second positioning actuator 204.

As depicted, transport actuator 200 is configured to move individual piece 134. For example, cutter system 116 is in first location 208 and mandrel 118 is located in second location 210. Transport actuator 200 in actuator system 120 is configured to move individual piece 134 from first location 208 after being formed by cutting sheet of acoustical material 124 in FIG. 1 to second location 210 for joining by joiner 122 shown in FIG. 1.

As depicted, individual piece 134 has a flat pattern. In this illustrative example, first positioning actuator 202 is configured to position first edge 214 of individual piece 134 around mandrel 118. Second positioning actuator 204 is configured to position second edge 216 of individual piece 134 around mandrel 118. In this example, the two edges, first edge 214 and second edge 216, have a position selected from overlapping each other and being adjacent to each other. In this manner, the two edges may be joined to form a three-dimensional structure from flat pattern 128 shown in block form in FIG. 1 of individual piece 134 in the form of conical shaped acoustic structure 130.

The illustration of manufacturing environment 100 and the different components in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples describe platform 108 with respect to aircraft 110, another illustrative example may be applied to other types of platforms. Platform 108 may be, for example, a mobile platform, a stationary platform, a land-based structure, an aquatic-based structure, or a space-based structure. More specifically, platform 108 may be a surface ship, a tank, a personnel carrier, a train, a spacecraft, a space station, a satellite, a submarine, an automobile, a power plant, a bridge, a dam, a house, a manufacturing facility, a building, or other suitable platforms.

Figure 3:
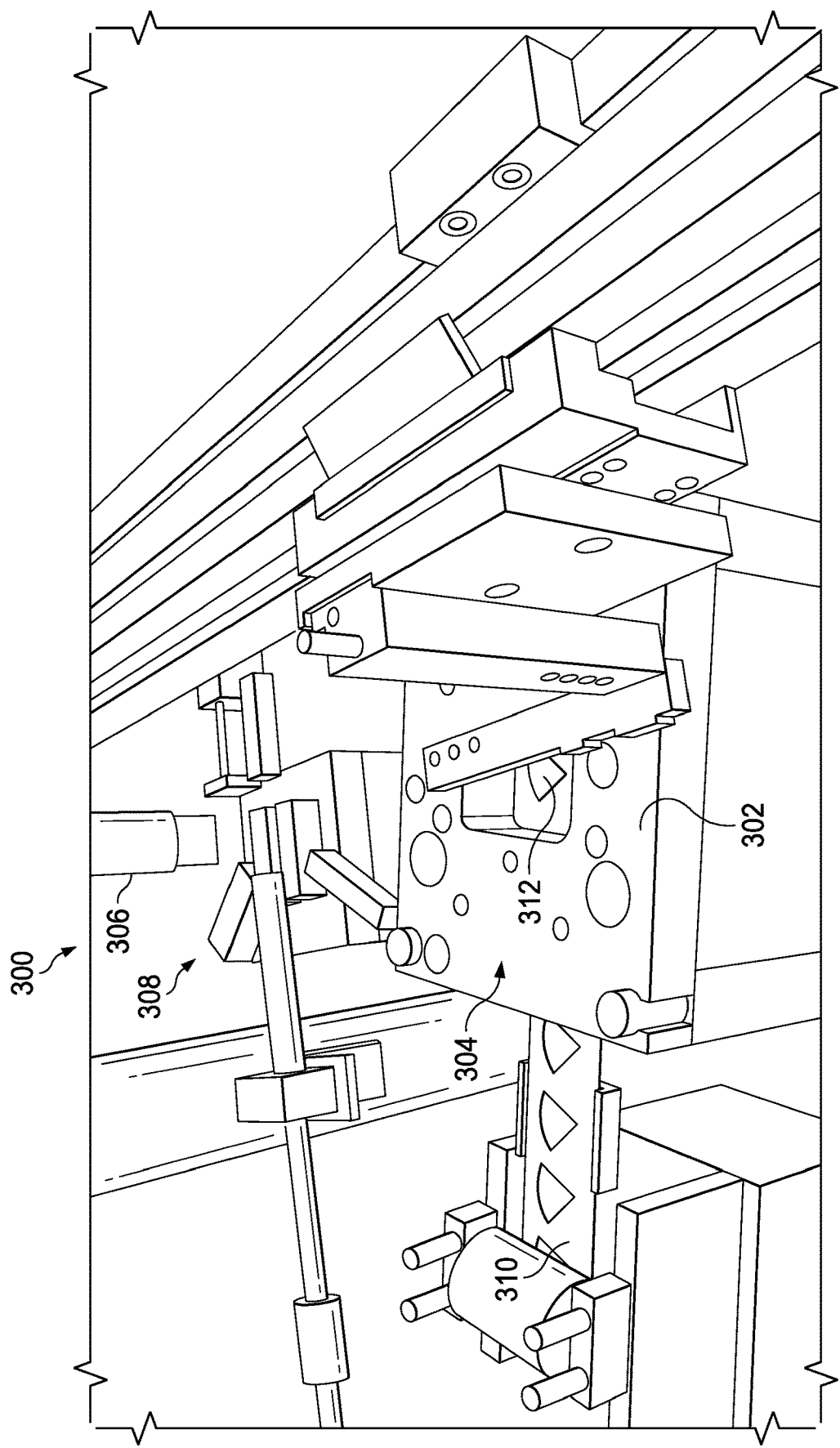
FIG. 3 is an illustration of a manufacturing system for use in manufacturing conical shaped acoustic structures in accordance with an illustrative embodiment.

With reference to FIGS. 3-10, illustrations of a process for forming a conical shaped acoustic structure are depicted in accordance with illustrative embodiments. With reference first to FIG. 3, an illustration of a manufacturing system for use in manufacturing conical shaped acoustic structures is depicted in accordance with an illustrative embodiment. In this illustrative example, acoustic device manufacturing system 300 is an example of a physical implementation for acoustic device manufacturing system 112 shown in block form in FIG. 1.

In this figure, acoustic device manufacturing system 300 includes a number of different components. As depicted, cutter system 302 is located in first location 304 and joiner 306 is located in second location 308.

In this illustrative example, cutter system 302 is a die cutter. Cutter system 302 is configured to cut individual pieces from sheet of acoustical material 310. A material supply system (not shown) supplies sheet of acoustical material 310 to cutter system 302. In this illustrative example, individual piece 312 has been cut from sheet of acoustical material 310 by cutter system 302.

Joiner 306 is an ultrasonic joiner in this illustrative example. Joiner 306 is configured to join edges of individual pieces to form conical shaped acoustic structures.

Figure 4:
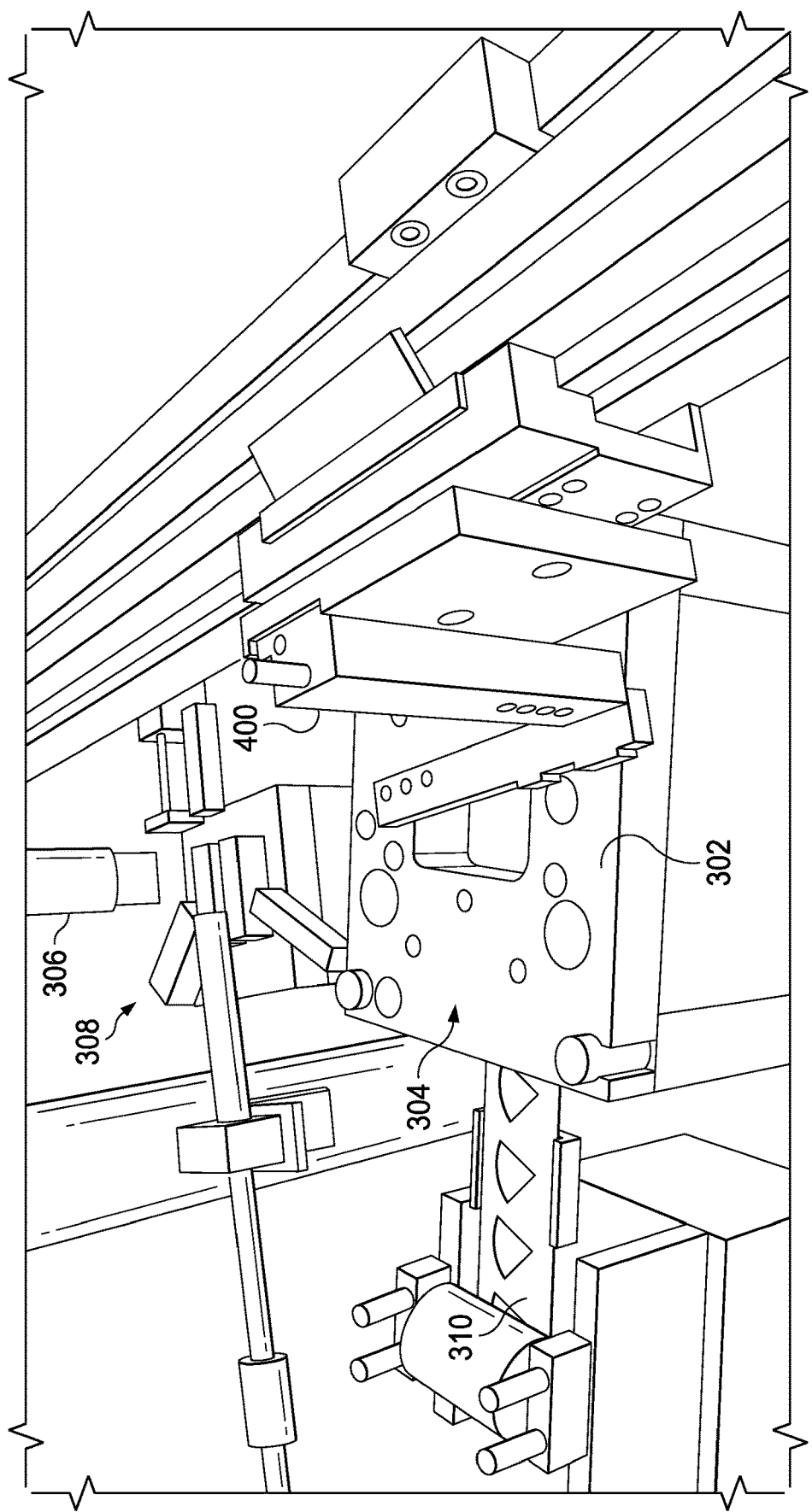
FIG. 4 is an illustration of handling an individual piece for joining in a manufacturing system in accordance with an illustrative embodiment.

With reference now to FIG. 4, an illustration of handling an individual piece for joining in a manufacturing system is depicted in accordance with an illustrative embodiment. As depicted, transport actuator 400 has picked up individual piece 312 (not shown) from cutter system 302.

Figure 5:
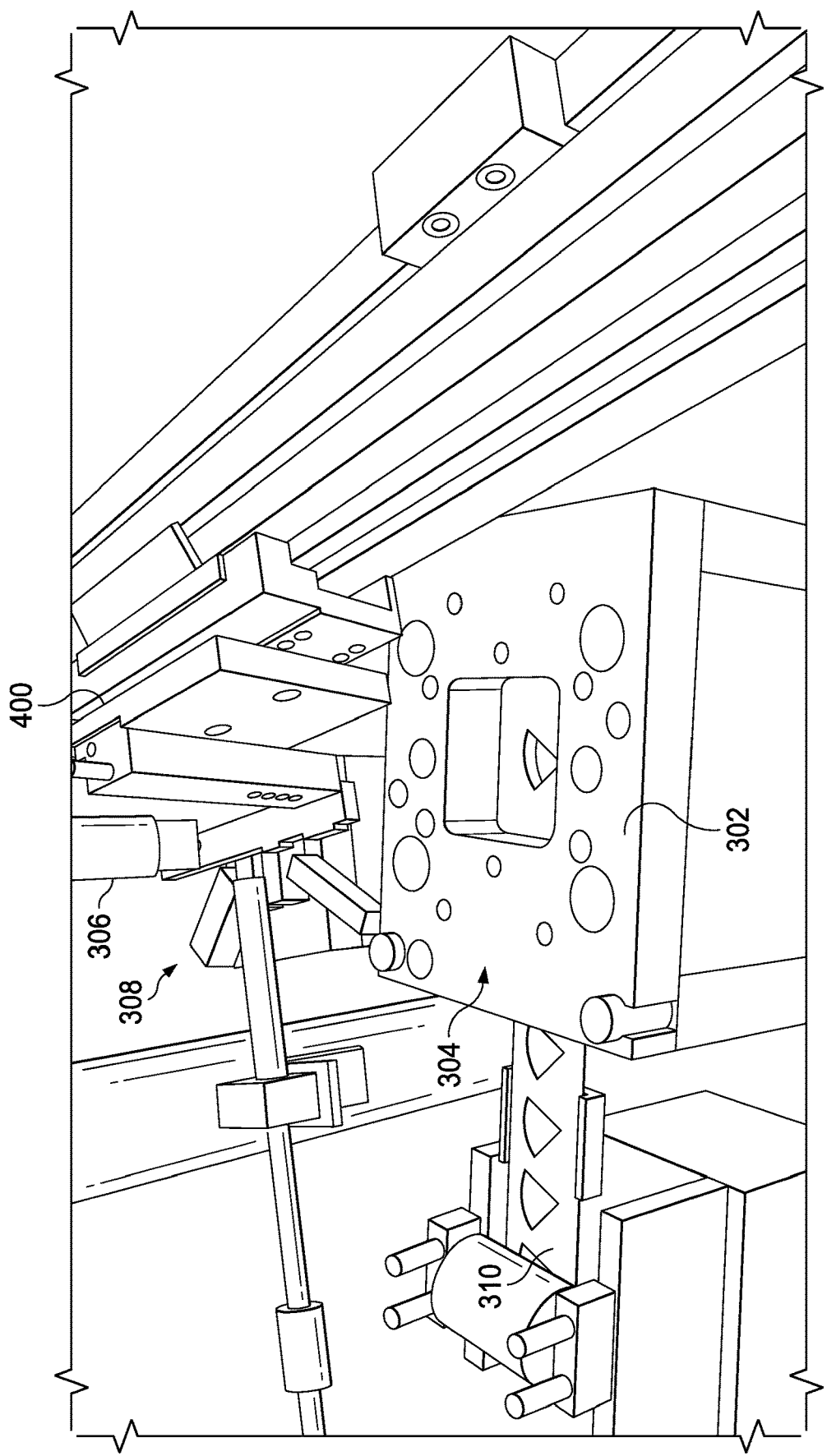
FIG. 5 is an illustration of transporting an individual piece in accordance with an illustrative embodiment.

With reference next to FIG. 5, an illustration of transporting an individual piece is depicted in accordance with an illustrative embodiment. In this figure, transport actuator 400 moves individual piece 312 (not shown) from first location 304 where cutter system 302 is located to second location 308 where joiner 306 is located.

Figure 6:
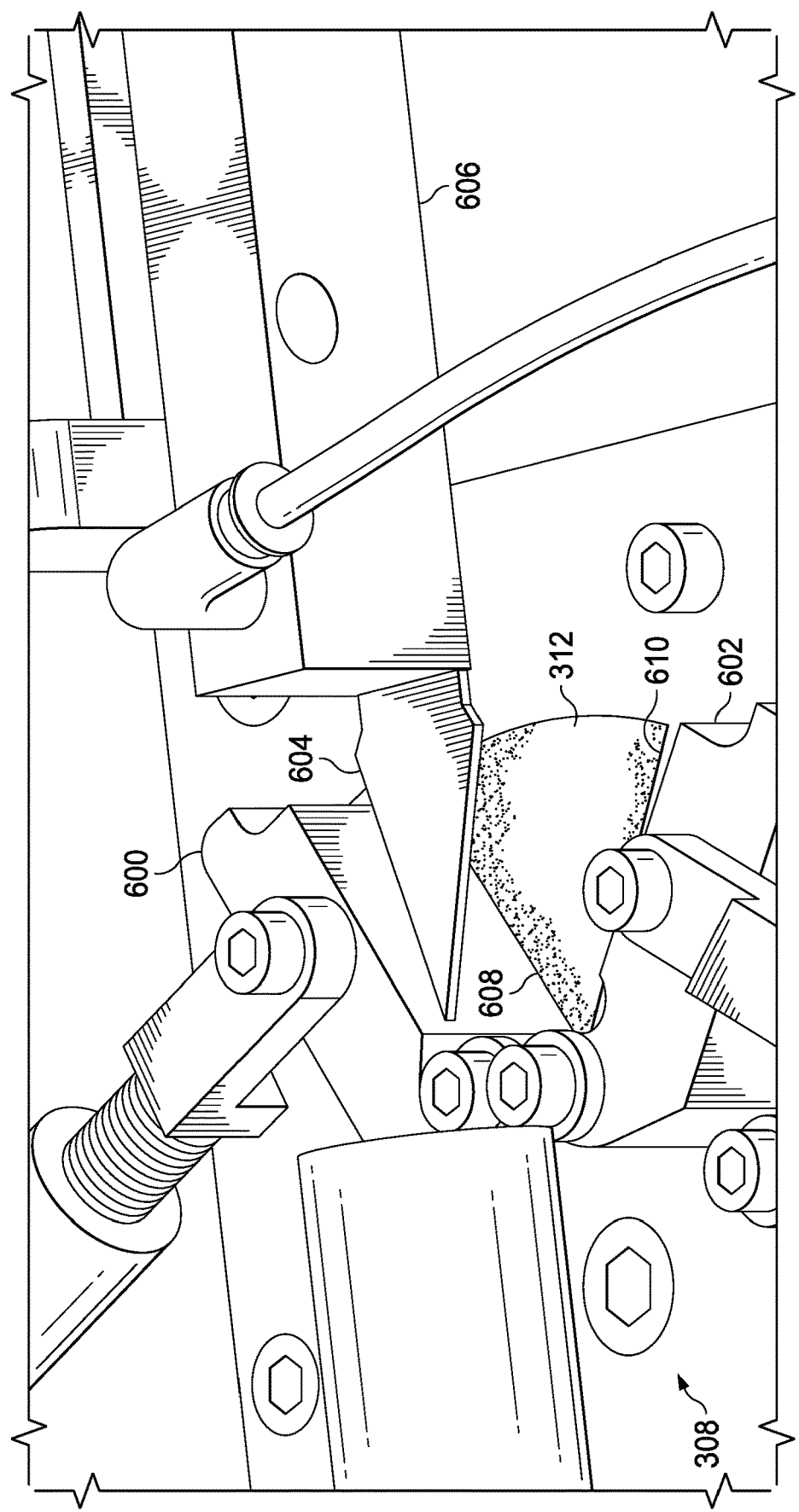
FIG. 6 is an illustration of an individual piece positioned relative to a mandrel in accordance with an illustrative embodiment.

With reference now to FIG. 6, an illustration of an individual piece positioned relative to a mandrel is depicted in accordance with an illustrative embodiment. In this figure, a view of second location 308 is shown with individual piece 312 located between first positioning actuator 600 and second positioning actuator 602.

In this view, mandrel 604 is moved relative to individual piece 312 by mandrel actuator 606. As depicted, mandrel 604 has a flat conical shape. In this illustrative example, two edges are seen for individual piece 312. These two edges include first edge 608 and second edge 610 for individual piece 312.

Figure 7:
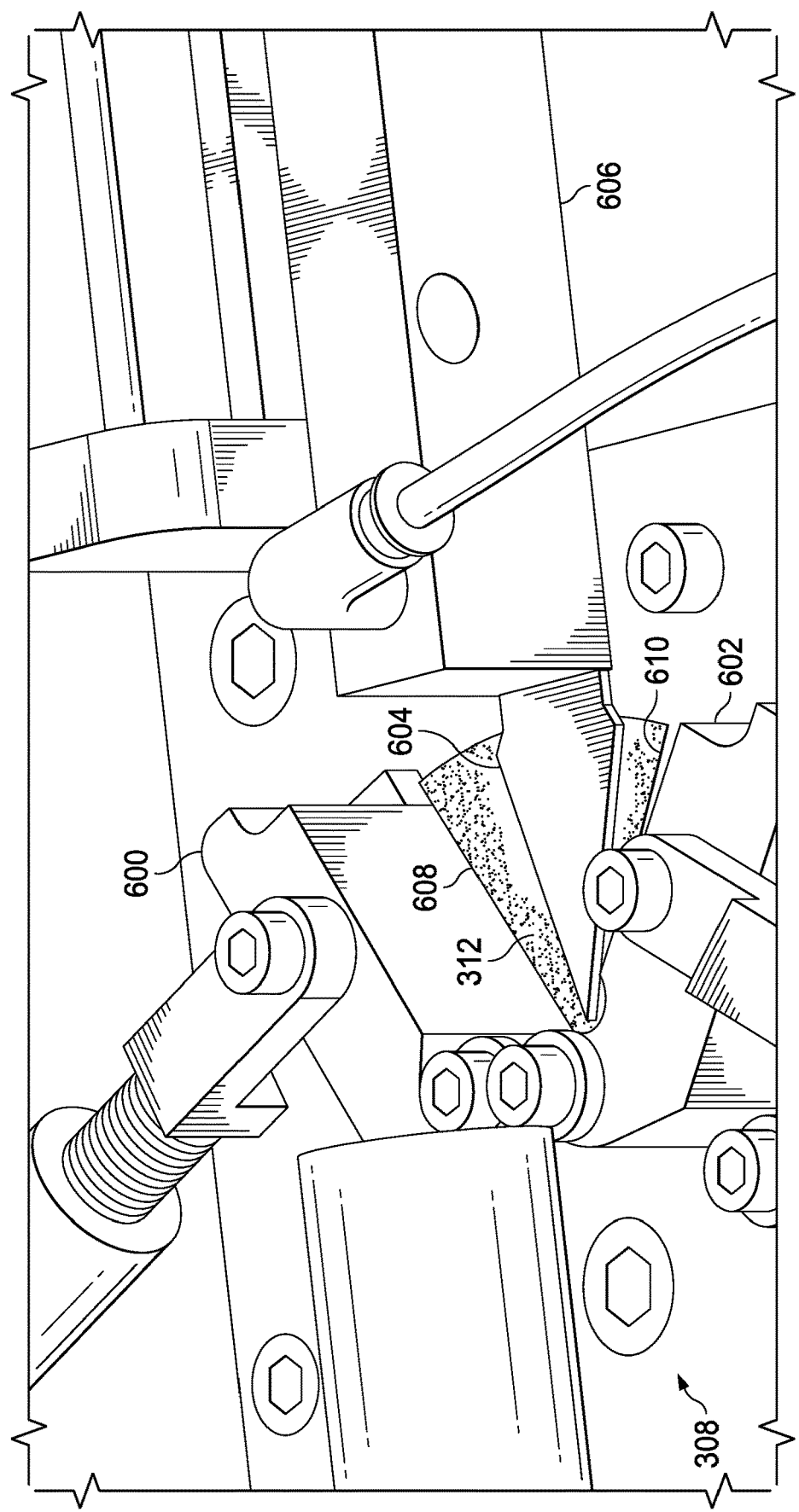
FIG. 7 is an illustration of an individual piece positioned relative to a mandrel in accordance with an illustrative embodiment.

With reference next to FIG. 7, an illustration of an individual piece positioned relative to a mandrel is depicted in accordance with an illustrative embodiment. In this depicted example, mandrel 604 has been moved into a position relative to individual piece 312 for forming a conical shaped acoustic structure.

Figure 8:
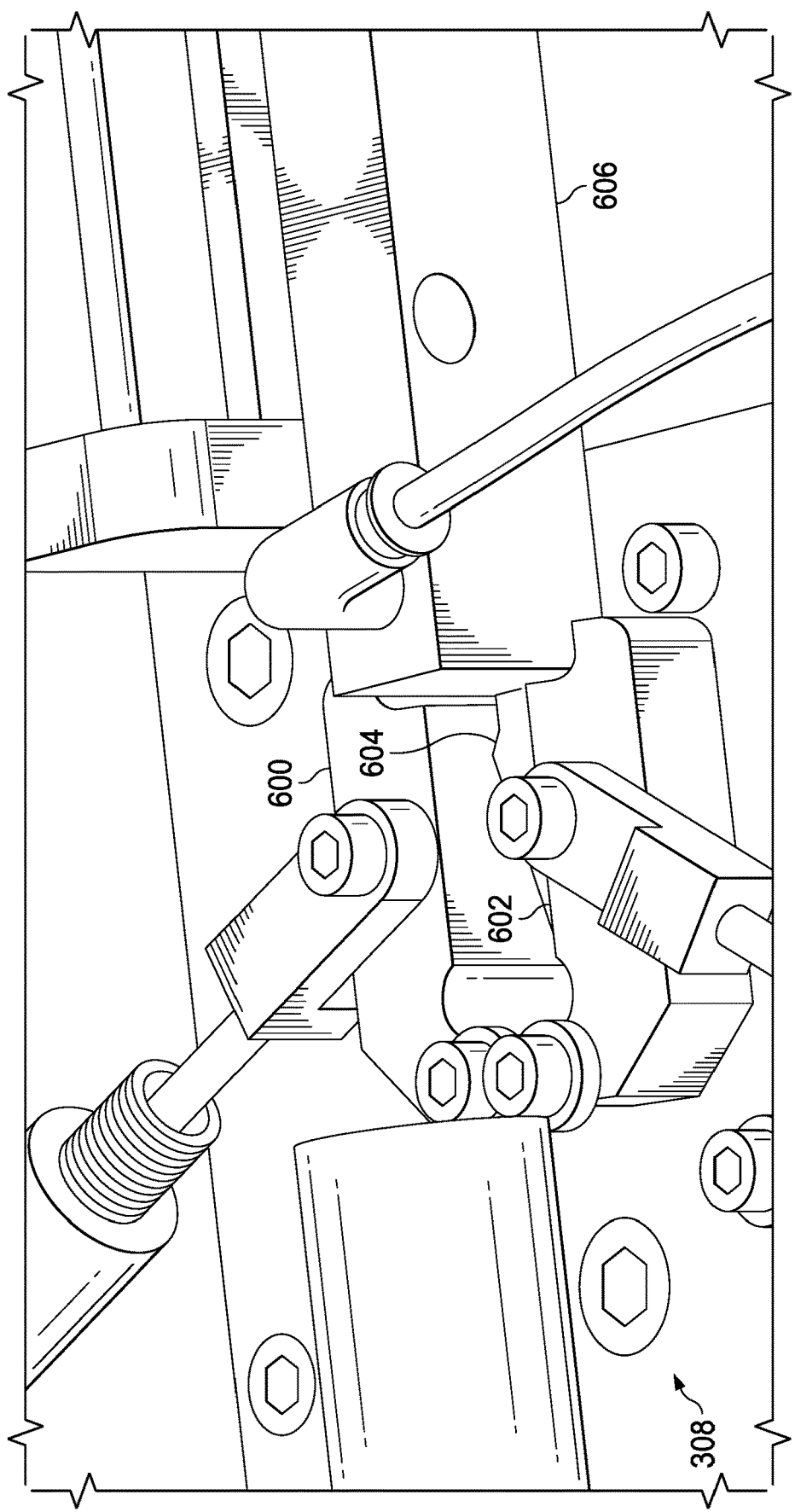
FIG. 8 is an illustration of a positioning of edges in an individual piece in accordance with an illustrative embodiment.

In FIG. 8, an illustration of a positioning of edges in an individual piece is depicted in accordance with an illustrative embodiment. As depicted, first positioning actuator 600 and second positioning actuator 602 have moved to position first edge 608 (not shown) and second edge 610 (not shown) relative to mandrel 604.

Figure 9:
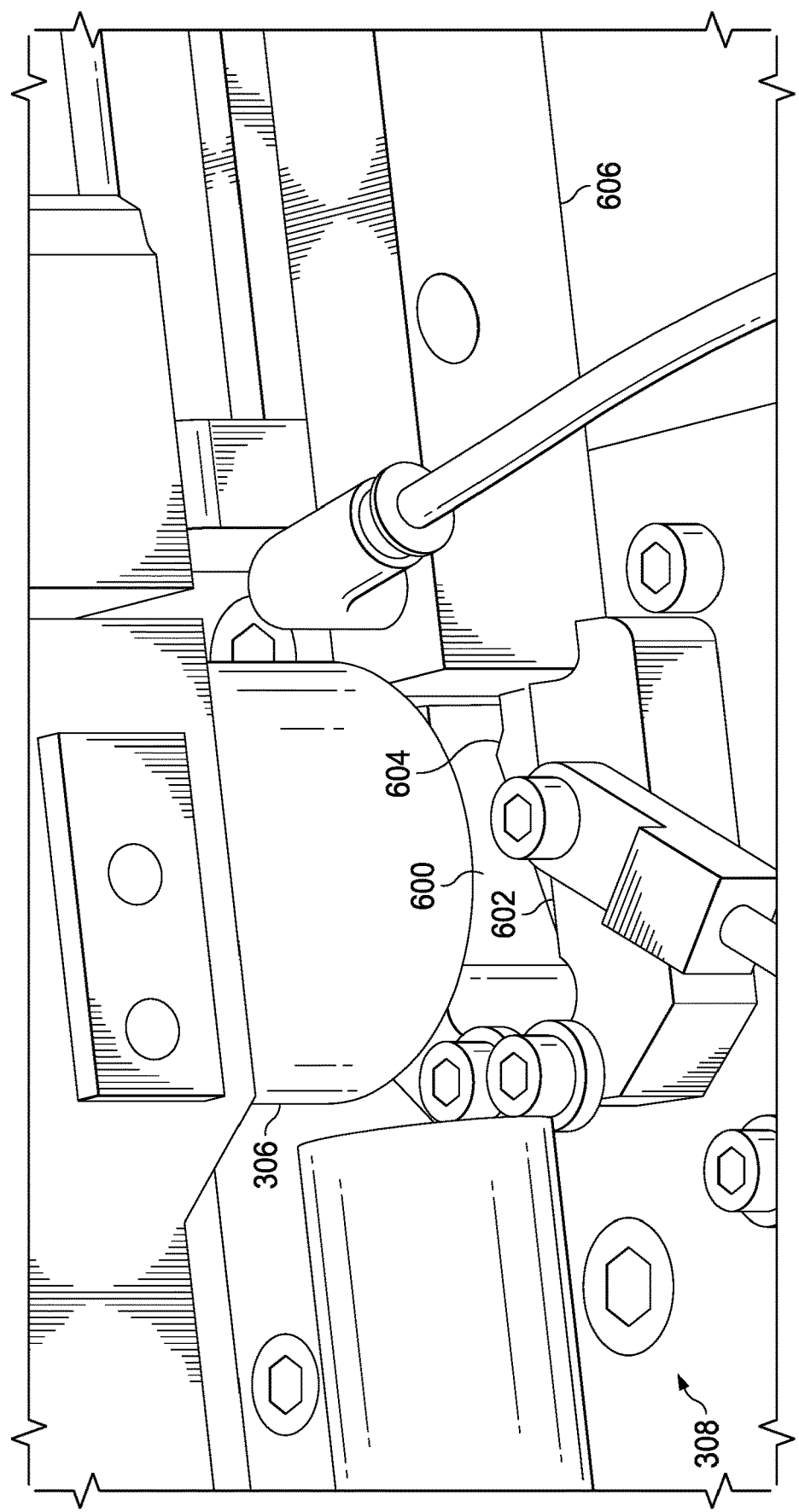
FIG. 9 is an illustration of joining two edges of an individual piece in accordance with an illustrative embodiment.

With reference to FIG. 9, an illustration of joining two edges of an individual piece is depicted in accordance with an illustrative embodiment. In this figure, joiner 306 has been moved relative to individual piece 312 (not shown) as positioned using first positioning actuator 600 and second positioning actuator 602.

Figure 10:
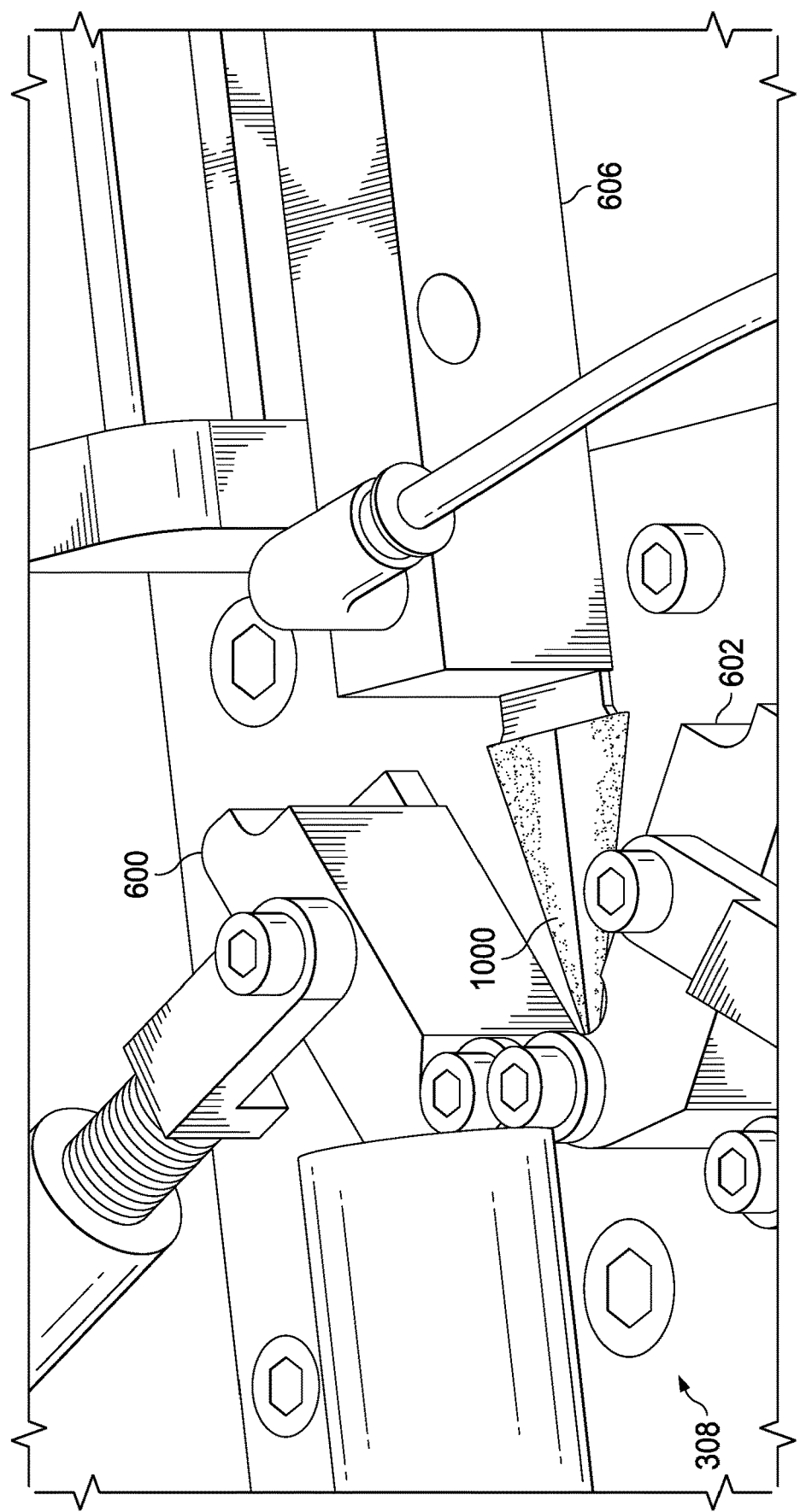
FIG. 10 is an illustration of a conical shaped acoustic structure formed by joining in accordance with an illustrative embodiment.

In FIG. 10, an illustration of a conical shaped acoustic structure formed by joining is depicted in accordance with an illustrative embodiment. In this view, joiner 306 (not shown) has been moved away from mandrel 604 to show conical shaped acoustic structure 1000. In this state, conical shaped acoustic structure 1000 is flat and will open up when removed from mandrel 604 to have the desired shape for use in cells in a composite sandwich panel. In this illustrative example, conical shaped acoustic structure 1000 is formed from joining the two edges of individual piece 312 (not shown).

The illustration of the process for forming a conical shaped acoustic structure in FIGS. 3-10 has been presented for purposes of illustrating one manner in which the process may be implemented. This example is not meant to imply limitations on the manner in which other illustrative examples may be implemented. For example, a laser cutter may be used in place of the die cutter illustrated for cutter system 302. In another illustrative example, sheet of acoustical material 310 may be wider such that rows of individual pieces may be cut from sheet of acoustical material 310.

Figure 11:
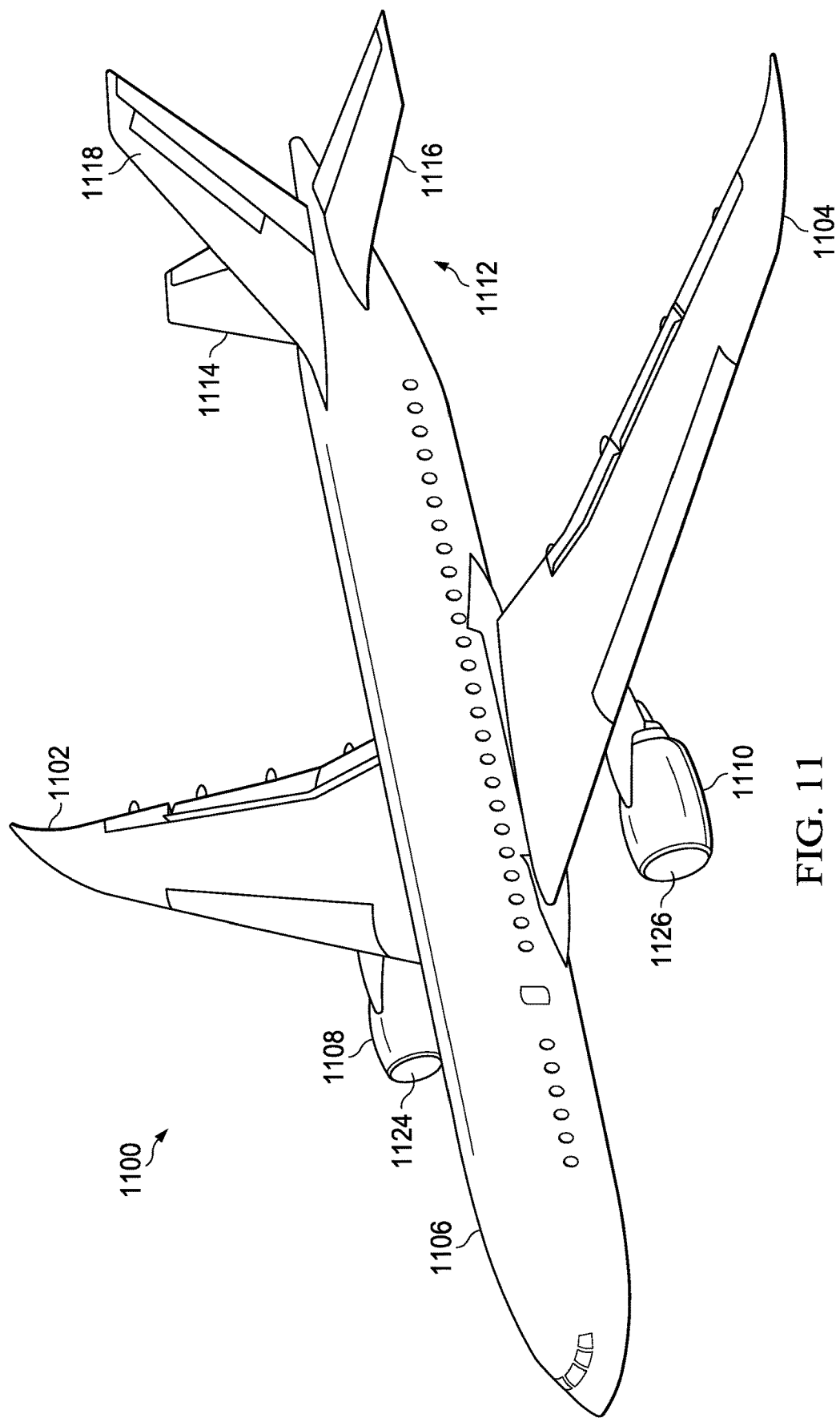
FIG. 11 is an illustration of an aircraft in accordance with an illustrative embodiment.

With reference to FIG. 11, an illustration of an aircraft is depicted in accordance with an illustrative embodiment. In this illustrative example, aircraft 1100 has wing 1102 and wing 1104 attached to body 1106. Aircraft 1100 includes engine 1108 attached to wing 1102 and engine 1110 attached to wing 1104.

Body 1106 has tail section 1112. Horizontal stabilizer 1114, horizontal stabilizer 1116, and vertical stabilizer 1118 are attached to tail section 1112 of body 1106.

Aircraft 1100 is an example of an aircraft in which conical shaped acoustic structures may be implemented to reduce noise in accordance with an illustrative embodiment. Conical shaped acoustic structures may be used in nacelles and, in particular, within acoustic panels used in the nacelles for aircraft engines. For example, the acoustic panels may be implemented in inlet 1124 in engine 1108 and inlet 1126 in engine 1110.

Figure 12:
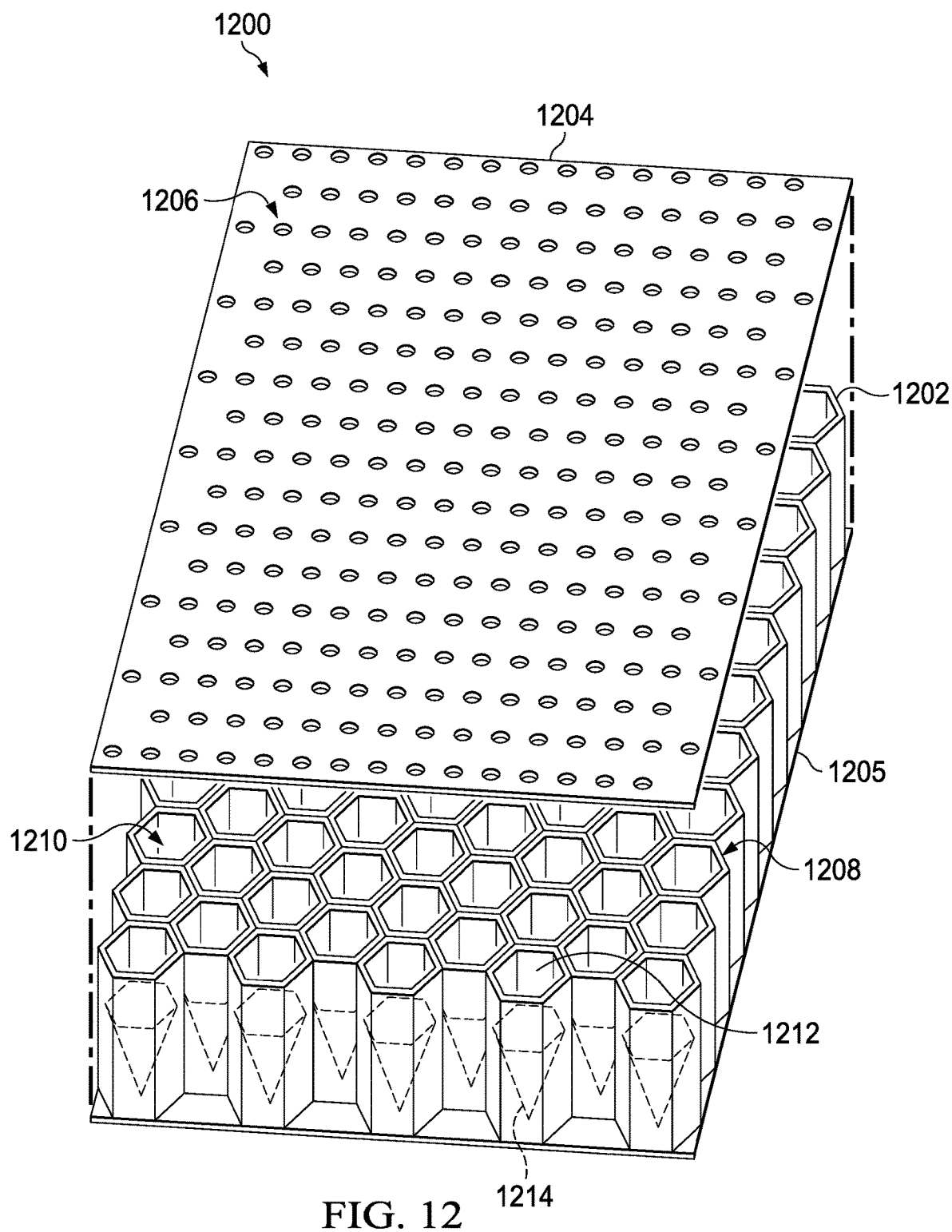
FIG. 12 is an illustration of an acoustic panel in accordance with an illustrative embodiment.

With reference next to FIG. 12, an illustration of an acoustic panel is depicted in accordance with an illustrative embodiment. In this illustrative example, acoustic panel 1200 may be used in inlet 1124 or inlet 1126 in FIG. 11.

As depicted, acoustic panel 1200 includes core 1202 located between inner face sheet 1204 and outer face sheet 1205. In this illustrative example, core 1202 is a honeycomb core. In other illustrative examples, cores with cellular shapes other than hexagonal shapes may be used.

As depicted, inner face sheet 1204 includes holes 1206. Core 1202 is a cellular structure that has cells 1208 that contain conical shaped acoustic structures 1210. For example, cell 1212 includes conical shaped acoustic structure 1214 shown within cell 1212 by dotted lines. These conical structures are examples of conical shaped acoustic structures shown in block form in FIG. 1.

In this illustrative example, utilizing conical shaped acoustic structures 1210 within cells 1208 reduces noise from an aircraft engine. In this illustrative example, holes 1206 may aid in channeling sound waves into core 1202.

Turning next to FIG. 13, an illustration of a flowchart of a process for manufacturing a conical shaped acoustic structure is depicted in accordance with an illustrative embodiment. The process illustrated in FIG. 13 can be implemented in acoustic device manufacturing system 112 for use in manufacturing conical shaped acoustic structures 102, both shown in block form in FIG. 1.

The process begins by cutting a sheet of acoustical material to form individual pieces using a cutter system (operation 1300). Each individual piece in the individual pieces has a flat pattern for a conical shaped acoustic structure.

The process positions an individual piece around a mandrel with a conical shape using an actuator system (operation 1302). In operation 1302, two edges of the individual piece are positioned for joining. The process joins the two edges of the individual piece positioned around the mandrel to form a conical shaped acoustic structure (operation 1304). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in accordance with an illustrative embodiment. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500. For example, manufacturing conical shaped acoustic structures can be performed with a desired level of efficiency that expedites the assembly of aircraft 1500, as well as reducing the cost of aircraft 1500. For example, conical shaped acoustic structures may be manufactured using acoustic device manufacturing system 112 in FIG. 1 at a rate that increases the speed at which acoustic panels can be manufactured.

Figure 16:
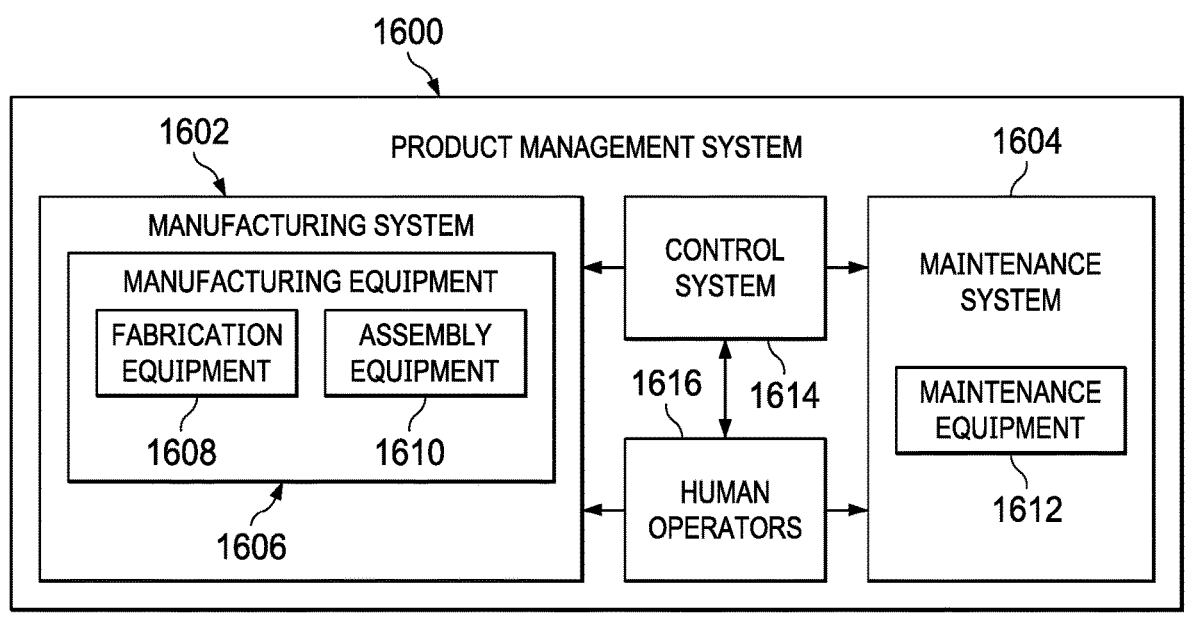
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 may include at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. In the illustrative example, acoustic device manufacturing system 112 of FIG. 1 is an example of equipment that may be implemented in manufacturing system 1602. Manufacturing equipment 1606 includes at least one of fabrication equipment 1608 and assembly equipment 1610.

Fabrication equipment 1608 is equipment that may be used to fabricate components for parts used to form aircraft 1500 in FIG. 15. For example, fabrication equipment 1608 may include machines and tools. These machines and tools may be at least one of a drill, a hydraulic press, a furnace, a mold, a composite tape laying machine, a vacuum system, a lathe, or other suitable types of equipment. Fabrication equipment 1608 may be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500 in FIG. 15. In particular, assembly equipment 1610 may be used to assemble components and parts to form aircraft 1500 in FIG. 15. Assembly equipment 1610 also may include machines and tools. These machines and tools may be at least one of a robotic arm, a crawler, a faster installation system, a rail-based drilling system, or a robot. Assembly equipment 1610 may be used to assemble parts such as seats, horizontal stabilizers, wings, engines, engine housings, landing gear systems, and other parts for aircraft 1500 in FIG. 15.

In this illustrative example, maintenance system 1604 includes maintenance equipment 1612. Maintenance equipment 1612 may include any equipment needed to perform maintenance on aircraft 1500 in FIG. 15. Maintenance equipment 1612 may include tools for performing different operations on parts on aircraft 1500 in FIG. 15. These operations may include at least one of disassembling parts, refurbishing parts, inspecting parts, reworking parts, manufacturing replacement parts, or other operations for performing maintenance on aircraft 1500 in FIG. 15. These operations may be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable device. In some cases, maintenance equipment 1612 may include fabrication equipment 1608, assembly equipment 1610, or both, to produce and assemble parts that may be needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 may control the operation of at least one of fabrication equipment 1608, assembly equipment 1610, or maintenance equipment 1612.

The hardware in control system 1614 may be using hardware that may include computers, circuits, networks, and other types of equipment. The control may take the form of direct control of manufacturing equipment 1606. For example, robots, computer-controlled machines, and other equipment may be controlled by control system 1614. In other illustrative examples, control system 1614 may manage operations performed by human operators 1616 in manufacturing or performing maintenance on aircraft 1500 in FIG. 15. For example, control system 1614 may assign tasks, provide instructions, display models, or perform other operations to manage operations performed by human operators 1616. In these illustrative examples, controller 123 shown in block form in FIG. 1 may be implemented in control system 1614 to manage at least one of the manufacturing or maintenance of aircraft 1500 in FIG. 15.

In the different illustrative examples, human operators 1616 may operate or interact with at least one of manufacturing equipment 1606, maintenance equipment 1612, or control system 1614. This interaction may be performed to manufacture aircraft 1500 in FIG. 15.

Of course, product management system 1600 may be configured to manage other products other than aircraft 1500 in FIG. 15. Although product management system 1600 has been described with respect to manufacturing in the aerospace industry, product management system 1600 may be configured to manage products for other industries. For example, product management system 1600 may be configured to manufacture products for the automotive industry as well as any other suitable industries.

Thus, the illustrative examples provide a method, apparatus, and system for manufacturing conical shaped acoustic structures. The manufacturing of the structures is performed with a desired level of efficiency that reduces the time and cost for manufacturing acoustic panels utilized to reduce sound in aircraft and other types of platforms. With an acoustic device manufacturing system in accordance with an illustrative example, at least one of the complexity, labor, or cost may be reduced in manufacturing conical shaped acoustic structures. This manufacturing system increases the production rate of the conical shaped acoustic structures that is desirable for manufacturing acoustic panels for use in platforms, such as in the inlets of engines for aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An acoustic device manufacturing system comprising:
    a cutter system configured to receive a sheet of acoustical material and cut individual pieces from the sheet of acoustical material in which each individual piece in the individual pieces has a flat pattern for a conical shaped acoustic structure;
    a mandrel having a conical shape;
    at least one actuator moveable independent of the mandrel, the at least one actuator configured to position an individual piece in the individual pieces around the mandrel such that two edges of the individual piece are positioned for joining; and
    a joiner configured to join the two edges of the individual piece to form the conical shaped acoustic structure while the individual piece is around the mandrel.

2. The acoustic device manufacturing system of claim 1 further comprising:
    a material supply system configured to supply the sheet of acoustical material to the cutter system.

3. The acoustic device manufacturing system of claim 1, wherein the cutter system is selected from at least one of a laser cutting machine and a material die cutting machine.

4. The acoustic device manufacturing system of claim 1, wherein the cutter system is in a first location and the mandrel is located in a second location and wherein the at least one actuator is configured to move the individual piece from the first location after being formed by cutting the sheet of acoustical material to the second location for joining by the joiner.

5. The acoustic device manufacturing system of claim 1, wherein the at least one actuator comprises:
    a first positioning actuator configured to position a first edge of the individual piece around the mandrel; and
    a second positioning actuator configured to position a second edge of the individual piece around the mandrel.

6. The acoustic device manufacturing system of claim 5, wherein the two edges have a position selected from overlapping each other and being adjacent to each other.

7. The acoustic device manufacturing system of claim 5, wherein the joiner is selected from at least one of an ultrasonic welder, a hot air welder, or a dielectric welder.

8. The acoustic device manufacturing system of claim 1 further comprising:
    a transport actuator configured to move the conical shaped acoustic structure to a location for placement in a cellular structure.

9. The acoustic device manufacturing system of claim 1, wherein the conical shaped acoustic structure has dimensions selected for insertion into a cell of a cellular structure.

10. The acoustic device manufacturing system of claim 1, wherein the sheet of acoustical material is an acoustic fabric.

11. The acoustic device manufacturing system of claim 1, wherein the conical shaped acoustic structure has dimensions selected such that the conical shaped acoustic structure is placed in a cell of a honeycomb structure for a composite sandwich panel in a nacelle for an aircraft engine.

12. A method for manufacturing a conical shaped acoustic structure, the method comprising:
    cutting a sheet of acoustical material to form individual pieces using a cutter system of an acoustic device manufacturing system, wherein each individual piece in the individual pieces has a flat pattern for the conical shaped acoustic structure;

positioning a mandrel of the acoustic device manufacturing system with a conical shape over an individual piece of the individual pieces;

positioning the individual piece around the mandrel using at least one actuator moveable independent of the mandrel, while the mandrel is positioned over the individual piece, wherein positioning the individual piece around the mandrel comprises positioning the individual piece such that two edges of the individual piece are positioned for joining; and joining the two edges of the individual piece positioned around the mandrel to form the conical shaped acoustic structure using a joiner of the acoustic device manufacturing system.

13. The method of claim 12, wherein cutting the sheet of acoustical material to form the individual pieces comprises:

cutting the sheet of acoustical material to form the individual pieces using the cutter system, wherein the cutter system is selected from at least one of a laser cutting machine and a material die cutting machine.

14. The method of claim 12, wherein the cutter system is in a first location and the mandrel is in a second location and further comprising:

moving the individual piece from the first location after being formed by cutting the sheet of acoustical material to the second location for joining by a joiner using a transport actuator.

15. The method of claim 12, wherein the at least one actuator comprises a first positioning actuator configured to position a first edge of the individual piece around the mandrel and a second positioning actuator configured to position a second edge of the individual piece around the mandrel.

16. The method of claim 12, wherein after being positioned around the mandrel, the two edges have a position selected from overlapping each other and being adjacent to each other.

17. The method of claim 12, wherein joining the two edges of the individual piece positioned around the mandrel to form the conical shaped acoustic structure comprises:

joining the two edges of the individual piece positioned around the mandrel to form the conical shaped acoustic structure using a joiner selected from at least one of an ultrasonic welder, a hot air welder, or a dielectric welder.

18. The method of claim 12 further comprising:

moving the conical shaped acoustic structure to a location for placement in a honeycomb structure.

19. The method of claim 12, wherein the conical shaped acoustic structure has dimensions selected for insertion into a cell of a cellular structure.

20. The method of claim 12, wherein the sheet of acoustical material is an acoustic fabric.

21. The method of claim 12, wherein the conical shaped acoustic structure has dimensions selected such that the conical shaped acoustic structure is placed in a cell of a honeycomb structure for a composite sandwich panel in a nacelle for an aircraft engine.

* * * * *